United States Patent [19]

Paddison et al.

[11] 4,444,594

[45] Apr. 24, 1984

[54] ACID CURED INORGANIC BINDER COMPOSITIONS WHICH ARE COMPATIBLE WITH MINERAL WOOL

[75] Inventors: Gary W. Paddison, York; Thelma J. Brackbill, Manheim; Larry L. Line, Lancaster, all of Pa.

[73] Assignee: Armstrong World Industries, Inc., Lancaster, Pa.

[21] Appl. No.: 448,312

[22] Filed: Dec. 9, 1982

[51] Int. Cl.$^3$ ............................ C04B 9/02; C04B 9/04
[52] U.S. Cl. .................................... 106/105; 106/106; 106/107
[58] Field of Search ...................... 106/105, 106, 107

[56] References Cited

U.S. PATENT DOCUMENTS

| | | | |
|---|---|---|---|
| 2,717,841 | 9/1955 | Biefeld et al. | 106/107 |
| 3,951,885 | 4/1976 | Thompson | 106/107 |
| 4,141,744 | 2/1979 | Prior et al. | 106/107 |

*Primary Examiner*—James Poer

[57] ABSTRACT

Acid cured inorganic compositions which are suitable for use as binder material and which are compatible, in their curing state, with mineral wool are disclosed. The compositions are produced by reacting $M_gO$ and an acid phosphate, chloride or sulfate salt, an aminoalcohol acid-attach control agent and water to form a curable slurry.

8 Claims, No Drawings

ACID CURED INORGANIC BINDER COMPOSITIONS WHICH ARE COMPATIBLE WITH MINERAL WOOL

The present invention relates to acid cured inorganic compositions which are suitable for use as binder material and which are compatible with mineral wool.

Such acid cured inorganic compositions are desirable when utilized in association with mineral wool containing ceiling boards since the resulting composite ceiling systems possess advantages that include high compressive and sheer strengths, low moisture sensitivity, low shrinkage at high temperatures (e.q. 2000° F.) and excellent sound absorbing properties. The composite ceiling systems are particularly useful in that they show a reduced tendency to sag and warp especially when exposed to humid atmospheric conditions. Many of these advantages are due at least in part to the inclusion of mineral wool in the ceiling boards of the composite ceiling systems.

The above advantages are short-lived and outweighed by the tendency of the mineral wool to be attacked by the inorganic acid in the binder system during the curing process with the subsequent release of noxious $H_2S$ gas and the eventual breakdown of the mineral wool fiber system.

Accordingly, it would be desirable to devise an acid cured inorganic composition that may be utilized as a binder and that does not, upon curing, degrade the mineral wool in a ceiling board with which it is in association so that the resulting composite ceiling system will, on a long-term basis, possess the various advantages set forth above. It is the primary object of the present invention to present an acid cured inorganic binder system which meets these requirements.

SUMMARY OF THE INVENTION

The mineral wool compatible inorganic acid cured composition of the present invention is made by incorporating in the composition an amino alcohol acid attack control agent that tends to retard the deleterious effects of the inorganic acid on mineral wool while permitting the composition to cure with its normal set and cure conditions.

In its preferred embodiment, such a composition shows particular utility as a binder-like coating in particular a backcoating, in a sag and warp resistant mineral wool-containing composite ceiling system.

The composition of the present invention is prepared by a reaction between $M_gO$ and an acid phosphate, sulfate or chloride salt in the presence of an inorganic filler, a liquid amino alcohol acid attack control agent and water to form a curable slurry. The exothermic heat generated by the reaction between the $M_gO$ and the acid phosphate, sulfate or chloride salt will cause the slurry to cure at room temperatures. However, for production purposes, it may be desirable to heat the slurry to accelerate the evaporation of water from the slurry and thereby speed the cure. The temperature at which the slurry is optionally heated is dependent on the production needs of the individual practitioner of the invention.

Suitable acid phosphate salts that may be utilized in the process and composition of the present invention include, for example, mono ammonium phosphate salt $(NH_4H_2PO_4)$, sodium phosphate salt $NaH_2PO_4$, and potassium phosphate salt $(KH_2PO_4)$. Suitable sulfate salts that may be utilized in the process and composition of the present invention include ammonium bisulfate $(NH_4HSO_4)$, sodium hydrogen sulfate $(NaHSO_4)$ and ammonium ferrous sulfate $((NH_4)_2Fe(SO_4)_2)$. Suitable acid chloride salts that may be utilized in the process and compositions of the present invention include ammonium chloride $(NH_4Cl)$, zinc chloride $ZnCl_2)$ and magnesium chloride $(MgCl_2)$. Acid phosphate salts are the salts of choice when the composition of the present invention is to be used as a backcoating binder in sag resistant ceiling systems. For such applications, the most preferred acid phosphate salt is mono ammonium phosphate salt.

The preferred acid cured inorganic composition, which shows utility as a coating in a sag and warp resistant ceiling system, of the present invention is produced by a reaction between an acid phosphate salt and magnesium oxide in the presence of water, at least one inorganic filler and an amino alcohol acid attack control agent to form a curable slurry. If desired, the composition may also include mineral acid cure accelerators (or retarders), inorganic and organic thickeners, inorganic and organic pigments and inorganic and organic foaming agents.

In the preferred method of the present invention, the acid phosphate salt is added to water which is preferably maintained at about 70° F. to about 130° F., and most preferably at about 115° F. The liquid aminoalcohol is then added to the solution, which is mixed until clear. The inert filler(s) is then added to the solution. The $M_gO$ is added last to the solution which is then mixed to form a working homogenous slurry.

With regard to other ingredients which may be utilized in the composition, a mineral acid cure accelerator, such as, for example, phosphoric, sulfuric, hydrochloric, nitric or acetic acid, can be added to the slurry at any time prior to the addition of the filler(s) and $M_gO$. The accelerator will speed the cure time of the composition. By the use of such accelerators the cure time of the composition of the present invention can be adjusted to accommodate the production demands of the individual practitioner of this invention. If an accelerator is used, it is preferably added after the addition of the liquid amino-alcohol. If desired, the working or pouring time of the slurry may alternatively be increased by the addition of a small amount of standard cure retarders, such as sodium hydroxide, to the solution or by temperature and/or dilution with water. In any event and regardless of the ingredients being utilized in the composition, the $M_gO$ should always be added last to the solution in order to avoid hydroxylation.

The term amino-alcohol is utilized herein to indicate either amine substituted alcohols and/or alcohol substituted amines. It has been discovered that those liquid amino-alcohols that have a pH within the range of from about 10.5 to about 13.5 are useful as acid control agents in the composition of the present invention.

Examples of suitable liquid amino-alcohols that may be utilized in the present invention include 2-dimethylaminoethanol; 2-amino-2-methyl-1-propanol; 2,2-imino diethanol; ethanolamine, 2-aminoethanol; aminoethylethanolamine; 1-amino-2-propanol; 1-dimethylamine-2-propanol; dimethyl isopropanol amine; 2-amino-2-ethyl-1,3-propanediol diethylamino ethanol; diethyl ethanol amine; N-methyldiethanolamine; dimethyl amino-2-methyl-1-propanol and 2-dimethyl-1-propanol.

The M$_g$O utilized in the present invention is in a ground calcined form which can be produced from dolomite (CaMg(CO$_3$)$_2$), magnesite (MgCO$_3$) or from chemically precipitated magnesium hydroxide, which, for most applications of the present composition, according to procedures as generally set forth in U.S. Pat. No. 3,821,006. However, when utilized as a binder in a sag and warp resistant ceiling system, the degree of calcining of the M$_g$O should be such as to produce a specific gravity of 3.60±0.05 g/cm$^3$, to produce nearly all crystalline M$_g$O. In addition, when utilize for such purposes the M$_g$O particle size distribution should fall within the following range:

| Size | Percent |
|---|---|
| greater than 15 microns | 0 to about 30 |
| 5 to 15 microns | about 50 to about 100 |
| less than 5 microns | 0 to about 30 |

It is preferred that from about 5 weight parts to about 25 weight parts amino-alcohol control agent, relative to the total weight parts of water, be utilized in the present composition of the present invention.

The preferred ratio of the acid phosphate salt to the M$_g$O is, by weight parts, from about 1 to about 2.25 weight parts of acid phosphate salt for every 1 weight part of M$_g$O. Less than 1 weight part of acid phosphate salt will give a composition that has a very weak cure. When greater than about 2.25 weight parts of acid phosphate salt are employed, the reaction between the acid phosphate salt and the M$_g$O will proceed too rapidly and there will be crumbling in the resulting composition.

When used as a binder for a sag resistant ceiling system, it is preferred that the composition of the present invention contain from about 40 weight percent to about 70 weight percent fillers based on the total weight of the compostion.

Inorganic fillers which are utilized in the composition include, for example, sand, silica, kaolinite clay, mica, wollastonite, dolomite, limestone, quartz, nepheline syenite, talc, alumina, aluminum trihydrate, aluma sil and/or kaolinite.

The overall usefulness of the filler depends on its effect on the chemical and rheological properties of the slurry. If the filler tends to swell or absorb water then the slurry viscosity will increase to a state (which is greater than approximately 1500 centipoise) where the effective reaction between the ammonium phosphate salt and the magnesium oxide will not occur and thus there will be no cure of the slurry. (For the purposes of the present specification, cure is defined as a state of hardness which will endure an impact of 15 lb/sq. in. without fracturing.)

The particular fillers utilized in the composition of the present invention will depend to a great deal on the end use of the composition. For example, if the composition is to be employed as a sag resistant coating to be incorporated in a ceiling system, it is preferred that at least one of the fillers used be dolomite and/or silicon dioxide.

Standard organic and inorganic thickeners that may be employed in the present invention include, for example, carboxy celluloses, sodium polyacrylates, sodium alginates, amorphous silica and mica.

In addition to being useful as an inorganic binder for a ceiling system, the composition of the present invention can also be used in applications such as, for example, protective surface coatings for ceiling products, layers or cores for new types of ceiling products, mill or ceiling board (when blended with mineral wool), quarry tile type floor and/or wall products, hot-tops, and high-temperature insulation material. It is understood that the proportions of the component ingredients and the identity of the optional ingredients, if any, in the composition of the present invention will vary with respect to the desired end use of the composition.

EXAMPLE 1

This example illustrates the preparation of the composition of the present invention and its utilization as a backcoating to reduce the amount of sag in a ceiling board system.

In this example, 30.7 g of acid ammonium phosphate salt (NH$_4$H$_2$PO$_4$) was added with agitation to 131 g of 115° F. water.

4.5 g of 2-amino-2-methyl-1-propanol was then added to the acid solution. The solution was mixed until clear whereupon 6.3 g of phosphoric acid was added. The solution was mixed an additional 15 minutes.

7.8 g of kaolinite clay, 8.8 g of mica and 38.8 g of dolomite were then added to the solution, followed by 37.0 g of M$_g$O to form a reactive slurry.

Two 2'×4' samples of a mineral fiber ceiling board one (Board A) having a density of 0.8 lbs./board ft. and the other (Board B) having a density of 1.5 lbs./board ft.) were each backcoated with 56 g/ft.$^2$ of the above reactive slurry. The boards were then dried at 550° F. for 3 minutes. Standard organic face coats were then applied to each board to form the finished composite ceiling units which were then coated with standard finishing paints. Boards A and B, respectively, showed, when compared to similar boards that were backcoated with standard polymeric (melamine formaldehyde) coatings, a 46% and a 40% improvement in the amount of sag.

EXAMPLE 2

In this Example, the procedures of Example 1 were substantially followed, except the amounts of the ingredients were changed and a different filler was employed, all as indicated below:

| Ingredient | Amount |
|---|---|
| NH$_4$H$_2$PO$_4$ | 16.5 g |
| water (115° F.) | 42.1 g |
| 2-amino-2-methyl-1-propanol | 2.2 g |
| phosphoric acid | 3.9 g |
| silicon dioxide filler | 26.4 g |
| MgO | 8.8 g |

Two boards, Board C (density 0.8 lbs./board ft.) and Board D (density 1.5 lbs./board ft.) were each backcoated with 38 g/ft.$^2$ of the reactive slurry prepared from the above formulation: the boards were dried and coated with standard organic face coats as per Example 1. Boards C and D, respectively, showed, when compared to similar boards that were backcoated with melamine formaldehyde coatings, a 92% and 93% improvement in the amount of sag.

We claim:

1. An acid cured inorganic binder composition that is compatible, in its curing state, to mineral wool, said composition being the reaction product of magnesium oxide and an acid phosphate, sulfate or chloride salt in the presence of water, at least one inorganic filler, and a liquid amino alcohol acid attack control agent.

2. A method of producing an acid cured inorganic binder composition which is compatible, in its curing state, to mineral wool, which method comprises reacting an acid phosphate, sulfate or chloride salt and magnesium oxide in the presence of water, at least one inorganic filler and a liquid amino-alcohol, said liquid amino-alcohol having a pH within the range of from about 10.5 to about 13.5, to thereby form a slurry which, upon curing, will form said inorganic binder composition.

3. The method of claim 2 wherein the acid salt is an acid phosphate salt.

4. The method of claim 3 wherein the acid phosphate salt is mono ammonium phosphate salt.

5. The method of claim 4 wherein the magnesium oxide has a specific gravity of from about 3.55 to about 3.65 g/cm$^3$ and wherein from about 0 to about 30 percent of the magnesium oxide particles are greater than about 15 microns in diameter, from about 50 to about 100 percent of the magnesium oxide particles are from about 5 microns to about 15 microns in diameter and from about 0 to about 30 percent of the magnesium oxide particles are less than about 5 microns in diameter.

6. The method of claim 5 wherein the inorganic filler comprises at least one of dolomite or silicon dioxide.

7. The method of claim 6 wherein the liquid amino-alcohol is 2-amino-2-methyl-1-propanol.

8. A sag and warp resistant ceiling system which comprises a mineral wool containing ceiling board which is backcoated with an acid cured inorganic binder composition made by the method of claim 7.

* * * * *